United States Patent Office 3,122,081
Patented Feb. 25, 1964

3,122,081
PHOTOGRAPHIC SHUTTER
Franz Singer, Munich, Germany, assignor to Compur-Werk Gesellschaft mit beschränkter Haftung & Co., Munich, Germany, a firm of Germany
Filed Nov. 27, 1961, Ser. No. 154,968
Claims priority, application Germany Nov. 30, 1960
6 Claims. (Cl. 95—63)

This invention relates to a photographic shutter, more particularly a shutter of the type called an objective shutter or a between-the-lens shutter, and especially but not exclusively to a shutter intended for use with a camera of the single lens reflex type, wherein the scene to be photographed is viewed by the photographer through the same lens through which the picture is taken and where, consequently, the shutter blades of the objective shutter must be open during the viewfinding and focusing operation.

An object of the invention is the provision of the generally improved and more satisfactory photographic shutter.

Another object is the provision of a shutter of the objective type, having simplified and more reliable mechanism for opening the shutter blades at the conclusion of the exposure (after first making provision for suitable protection of the photographic film from unwanted light) to make the camera ready for viewing for the next exposure, and simplified mechanism for closing the shutter blades at the end of the viewing operation and prior to the actual making of the next exposure, so that the film blocking or protecting means can be moved to ineffective position ready for the next exposure.

Another object of the invention is the provision of a shutter so designed that it eliminates the need for a rotatable ring on which the shutter blades are mounted, which ring is commonly used in prior shutters for single lens reflex cameras, in order to provide for opening the blades for viewing purposes.

Still another object is the provision of improved means whereby the shutter blades are positively connected to the main shutter driving member or master member during the making of the actual exposure, and are completely disconnected from and free of the master member at other times.

A further object is the provision of a photographic shutter of the kind above mentioned, in combination with improved operating and controlling mechanism which may, if desired, be located partly within the photographic camera itself.

These and other desirable objects may be attained in the manner disclosed as an illustrative embodiment of the invention in the following description and in the accompanying drawings forming a part hereof, in which.

Referring first to the construction of the shutter itself as shown in FIGS. 1–5, the shutter parts are preferably mounted in the usual conventional casing of annular shape, having an outer cylindrical wall fragmentarily shown at 11. Within the shutter casing or housing is a base plate or mechanism plate 4 which lies close to the back wall of the shutter housing and is in a general plane perpendicular to the optical axis. This mechanism plate 4 is held stationary within the shutter housing by any suitable fastening means, such as screws. The front lens tube of the usual conventional construction is fastened to the base plate 4 by means of screws passing through lugs or flanges 6 on the lens tube. The lens tube is fragmentarily shown at 8, and the space enclosed by it forms the optical aperture 10. The lens (not shown) is mounted, as usual, at least partly in the lens tube 8, with possibly other elements or components of the lens in a conventional rear lens tube.

A driver ring or blade ring 12 for the shutter blades 14 is rotatable about the optical axis (which axis passes centrally through the aperture 10) in an annular recess formed between the base plate 4 and the front lens tube 8, which members 4 and 8 are so shaped as to provide bearing surfaces for holding the blade ring 12 against axial or radial movement while permitting it to rotate. A weak restoring spring, schematically shown at 13, tends to move the blade ring 12 in a counterclockwise direction.

As customary, there are several shutter blades 14, usually about five, but the exact number thereof is unimportant for purposes of the present invention. Only one of the blades is illustrated, in order to simplify the showing, all of them being of the same construction. Double ended blades (which may be described also as double wing or double lobe blades) are used in the present shutter. Each blade is rotatably mounted on a pivot 16 on the base plate 4, and each blade has a control slot 18 extending in a radial direction with respect to its pivot 16. Control pins 20 mounted in the blade ring 12 engage in these control slots, so that rotation of the blade ring 12 about the optical axis results in simultaneous rotation of all of the shutter blades 14 on their pivot 16, in the same direction or sense of rotation as that of the blade ring 12.

The "master member" mechanism or means for driving the blade ring to open and close the shutter blades for making the actual exposure (but not for other purposes such as viewing or focusing) will now be described. The master member mechanism, considered as a whole, includes the rotary driving element or master member 22 mounted for oscillation on a pivot 24 secured to the base plate 4. A crank pin 26 on the member 22 serves for pivotally mounting one end of an oscillatable coupling member 28. The other or free end of the coupling member has a notch or claw 30 for making coupling engagement with an operating pin 31 on the blade ring 12. At its free end the coupling element 28 also has a forwardly bent ear or lug 32, arranged to engage under certain circumstances with a rearwardly bent flange 94 on a member 86 as further described below. The coupling element 28 is urged in a clockwise direction on its pivot 26, by a restoring spring 34, coiled around the crank pin 26, with one end of the spring bearing against the pivot pin 24 and the other end bearing against an edge of the coupling element 28. The driving force for turning the member 22 to open and close the shutter blades is supplied by the main spring or master spring 36, wound around the pivot 24, one end of this main spring bearing against a stationary pin 38 fastened to the base plate 4, the other end of the spring being bent and hooked into an opening 39 in the member 22.

Figure 1:
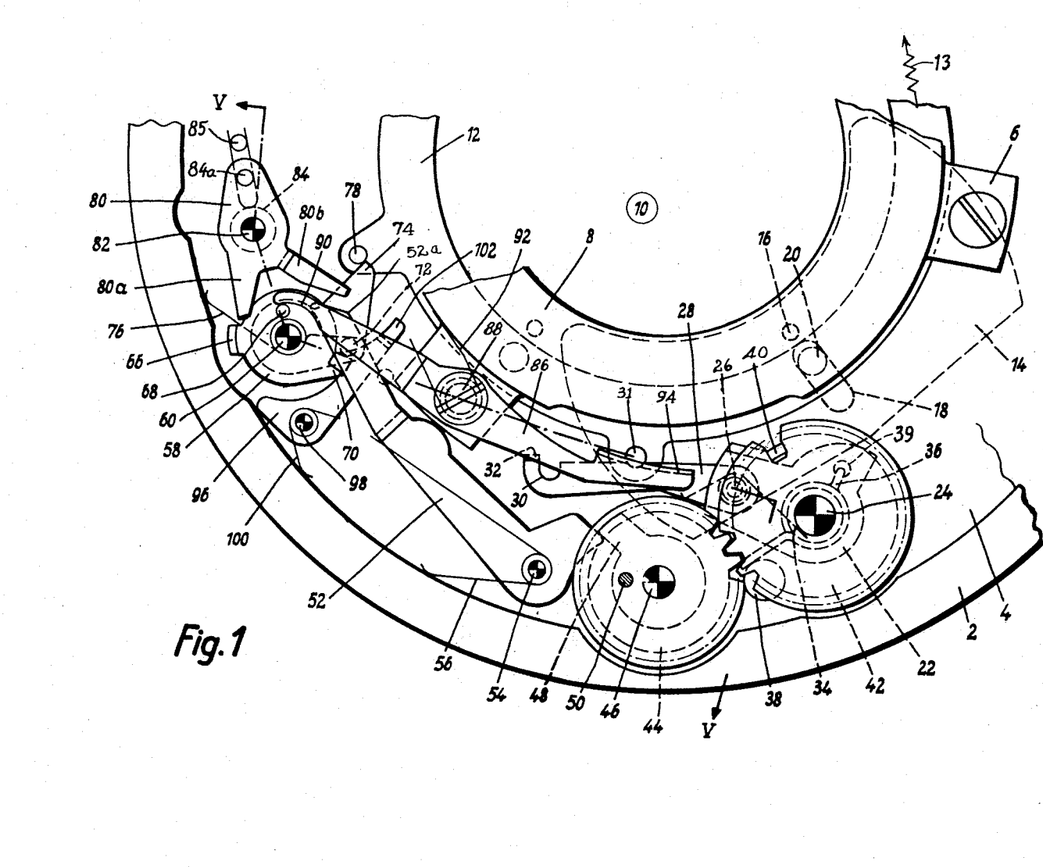
FIG. 1 is a somewhat schematic front face view of a shutter according to a preferred embodiment of the invention, with parts removed in order to show other parts beneath, the shutter being illustrated in the cocked or tensioned condition and with the shutter blades fully open for viewing the scene to be photographed.
Figure 2:
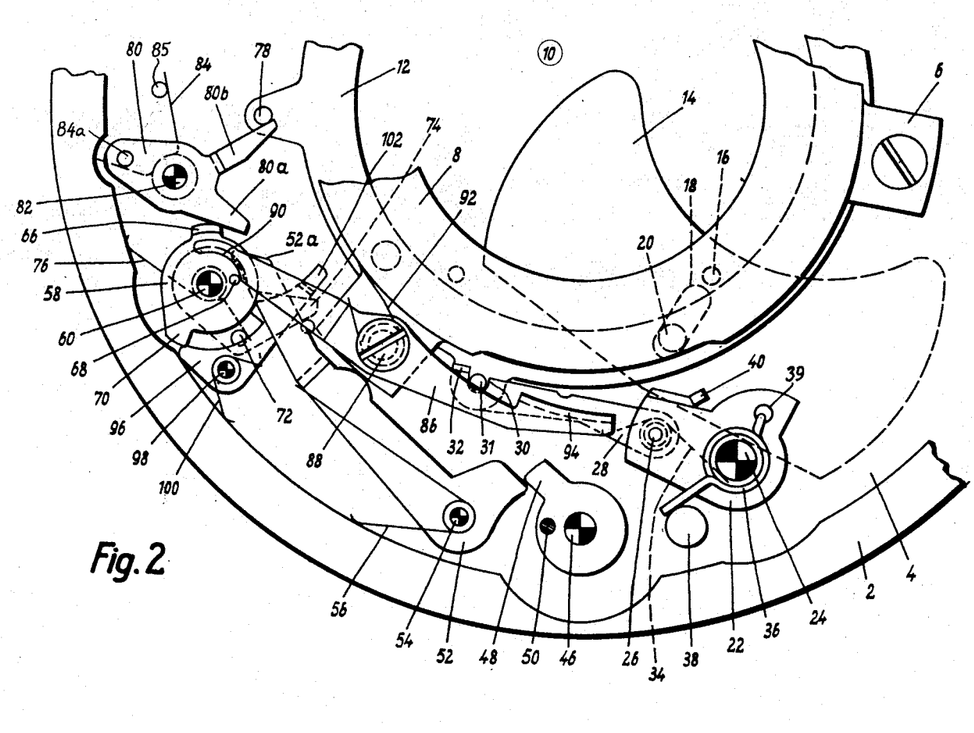
FIG. 2 is a similar view with the parts still in cocked or tensioned position but with the exposure-making cycle in progress and with the shutter blades closed at the conclusion of the viewing operation and ready to make the actual exposure, and with the master member still latched.
Figure 3:
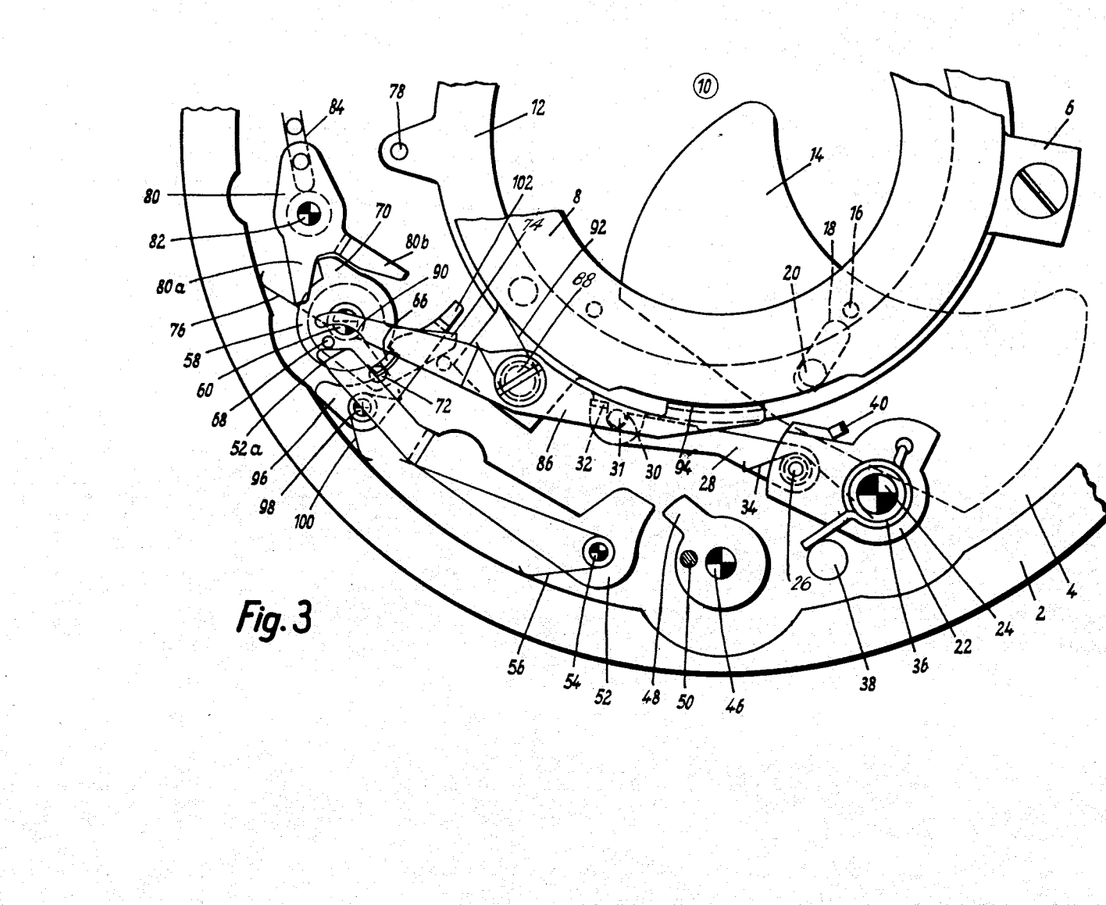
FIG. 3 is a similar view with the parts in position at an instant later than the position shown in FIG. 2, the master member now being unlatched and ready to run down to make the actual exposure.
Figure 4:
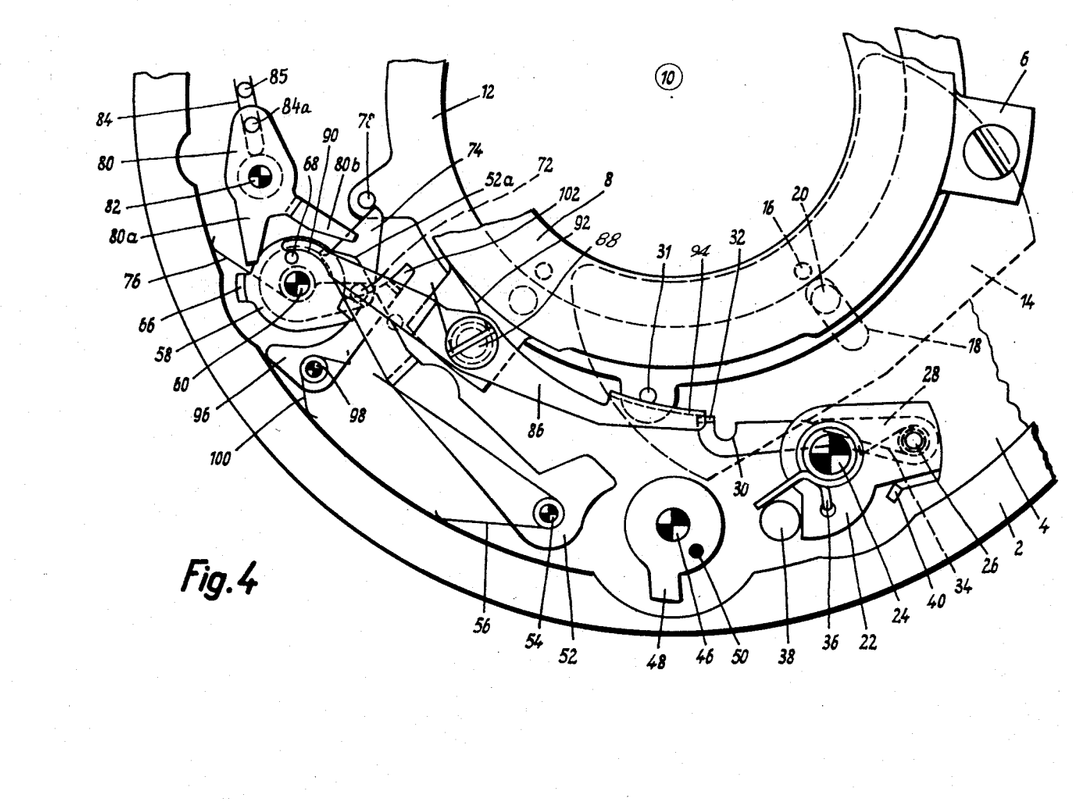
FIG. 4 is a similar view of the shutter in rest position at the completion of the exposure, the shutter blades again having opened for viewing after being closed at the end of the exposure.
Figure 5:
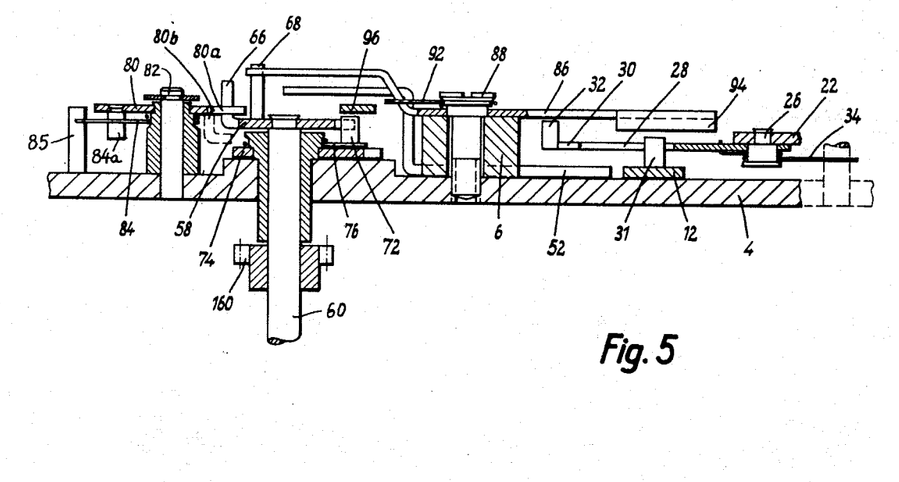
FIG. 5 is a section through a fragment of the shutter, taken approximately on the line V—V of FIG. 1.

The run down or rest position of the driving parts 22, 28 is shown in FIG. 4, while FIGS. 1, 2, and 3 show the tensioned or cocked position of these parts. For tensioning or cocking the master member, the following mechanism is employed: the member 22 has a forwardly bent or upstanding lug 40 which lies in a recess in the gear wheel 42 mounted on the pivot 24, so that the gear wheel 42 and the driving member 22 are operatively connected non-rotatably to each other. The gear 42 meshes with a second gear wheel 44 which is fixed to a tensioning shaft 46 in non-rotatable manner so that the shaft and the second gear wheel rotate with each other. This shaft 46 is rotatable in the base plate 4 and extends rearwardly through the base plate so as to be coupled to tensioning means located either in the rear part of the shutter housing or, preferably, in the body of the camera on which the shutter is mounted. At this point it may be desirable to mention that the word "camera" may from time to time be used in two different senses, one being a broad sense including the shutter mechanism as part of the camera (this being the sense in which the word is commonly used by the public) and the other being the more restricted and technical sense of the word, meaning only the camera body and the parts within it, as distinguished from the shutter mechanism and the shutter housing which protrudes from the front of the camera body. The contexts will indicate in which sense the word is used in any particular instance.

For latching the driving element or master member in its tensioned or cocked position, there is a locking tooth member 48 mounted on the shaft 46 and connected by a pin 50 to the gear wheel 44 so as to be non-rotatably fixed thereto. The latching tooth 48 cooperates with a latching pawl 52 rotatable on a fixed pivot 54 fastened to the base plate 4. A restoring spring 56 tends to turn the latch 52 in a clockwise direction on its pivot 54.

The arrangement which will now be described serves to prepare the shutter for an exposure, to unlatch the master member at the required time for the actual exposure movement, and to open the shutter blades again at the completion of the exposure, ready for viewing and focusing of the next scene to be photographed. This mechanism comprises a control disk 58 mounted on a control shaft 60 in non-rotatable relation thereto, so as to turn with the control shaft. This control shaft 60, like the tensioning shaft 46, is rotatable in the base plate or mechanism plate 4 and extends rearwardly through the base plate, the shafts 60 and 46 being parallel to each other and to the optical axis which passes through the exposure aperture 10. A spring 62 (FIGS. 6 and 7) located in the camera body and operatively connected to the shaft 60 in the manner further described below, serves at certain times to turn the shaft 60 in a clockwise direction (when viewed from the front as in FIGS. 1-4 and a restoring spring 64 (FIG. 6) also located in the camera body tends to return the shaft 60 in a counter-clockwise direction to its rest or run-down position, all as will be further described below. The above mentioned control disk 58 has a forwardly bent or upstanding lug 66, and also a pin 68 projecting from its front face, and it also has a tooth 70.

The spring 62, when effective on the shaft 60, tends to turn it clockwise with greater force than that exerted in the opposite direction by the spring 64. By means of a device which will be described below in connection with FIGS. 6 and 7, the spring 62 automatically becomes inoperative when the control disk 58 is in a ceratin angular position, so that the restoring spring 64 can act on the shaft 60 to turn it in a counterclockwise direction and restore the shaft and the disk 58 to their respective initial positions. During the reverse or restoring rotation of the control disk 58 in the counterclockwise direction, the tooth 70 on the disk engages behind a pin 72 on a blade opening lever 74 which is mounted for rotation on the shaft 60, and swings this opening lever 74 in a counterclockwise direction so that the lever engages a driver pin 78 on the blade ring 12 and moves this blade ring in a clockwise direction to the intermediate position or central position shown in FIG. 1, in which position the shutter blades 14 are open for viewing and focusing. A restoring spring 76, which is wound around the control shaft 60 and which has one end bearing against the housing 2 and the other end bearing against the pin 72, urges the opening lever 74 in a clockwise direction.

Somewhat offset from the position of the shaft 60 is a three-armed closing lever 80 rotatably mounted on a pivot 82 fixed in the mechanism plate 4 and urged by a restoring spring 84, which is, for example, wound around the pivot 82 and which has two arms embracing opposite sides of the pin 84a on the lever 80 and the stationary pin 85 on the plate 4. Thus the restoring spring acts in both directions of rotation, to hold the closing lever in the normal position shown in FIGS. 1, 3, and 4, while allowing it nevertheless to be displaced in either direction from this normal position. In this normal position of the closing lever 80, one arm 80a thereof lies in the path of motion of the lug 66 on the control disk 58, so that when the control disk rotates in a clockwise direction from the position shown in FIGS. 1 and 4, the lug 66 will engage the left edge of the arm 80a of the closing lever and swing the closing lever in a counterclockwise direction on its pivot 82, to the position shown in FIG. 2. During this counterclockwise swinging of the closing lever, the second arm 80b thereof engages the pin 78 on the blade ring 12 and swings the blade ring 12 in a clockwise direction, thus causing the blades 14 themselves to turn in a clockwise direction, from the fully open position shown in FIGS. 1 and 4, to the closed position shown in FIG. 2. Although only one blade is shown, it will be understood that the ends of the several different blades overlap each other in the conventional manner so that, when the respective blades are in the positions indicated in FIG. 2, the exposure aperture 10 is completely closed by the overlapped blades.

During this clockwise movement of the blade ring 12, the exposure driving pin 31 on the blade ring slides along the inner edge of the coupling member 28 (which is meanwhile held against the pin by the spring 34) until the pin reaches a position opposite the driving notch or claw 30 of the coupling member 28, at which time the spring 34 moves the coupling member 28 into embracing relation to the pin 31, establishing a positive driving connection between the blade ring and the master member mechanism, as shown in FIG. 2. When the control disk 58 moves a little further in a clockwise direction from the position shown in FIG. 2, the lug 66 on the control disk engages the beveled end 52a of the latching lever 52 and shifts the latching lever 52 to release the latch which holds the master member mechanism against its running down movement.

In order that the opening and closing movements of the blades, for viewfinding and focusing purposes, may be possible, under the influence of the opening lever 74 and closing lever 80, an uncoupling lever is provided for preventing the engagement of the coupling member 28 with the pin 31 except when such engagement is desired. This uncoupling lever is illustrated at 86, and it is rotatably mounted on a bolt or screw 88 which is conveniently a screw passing through one of the lugs 6 on the front lens tube 8 to hold this lens tube on the base plate 4. The uncoupling lever 86 has a restoring spring 92 which bears at one end against the periphery of the lens tube 8 and bears at the other end against the lever 86 to urge the uncoupling lever in a counterclockwise direction. At the right hand end of the lever 86 is a downwardly bent flange or lug 94 arranged to cooperate with the upstanding ear or lug 32 on the coupling lever 28. The other end or left hand end of the uncoupling lever 86 has an arcuate portion 90 arranged to cooperate with the upstanding pin 68 on the control disk 58.

In the initial position of the control disk, the pin 68 thereon engages the arcuate portion 90 of the uncoupling lever and holds the uncoupling lever in the uncoupling position shown in FIG. 1, which is the same position of these parts shown also in FIG. 4. In this position, the arcuate part 90 is concentric with the shaft 60. During the clockwise running-down movement of the control disk 58, the pin 68 leaves the arcuate portion 90 just after passing the position shown in FIG. 2 and before the latch 52 is released to start the actual exposure motion, so that the uncoupling lever 86 does not affect the coupling member 28 during the exposure. But during the counterclockwise return or restoring movement of the disk 58, the pin 68 engages the part 90 of the uncoupling lever 86 and moves it to uncoupling position early in the return movement before the opening lever 74 begins to act on the pin 78, and holds it in uncoupling position during the entire remainder of the return movement, all the way back to the initial position of the control disk 58, which is shown in both FIGS. 1 and 4. This motion of the uncoupling lever 86, during the return movement of the disk 58, causes the flange or lug 94 on the uncoupling lever to engage the ear 32 on the coupling member 28 and to move it radially outwardly from its coupling position, releasing the claw or notch 30 from the pin 31 to uncouple the master member mechanism completely from the blade ring 12 so that there will be no interference with moving the blade ring by action of the opening lever 74, to open the blades for viewing after the conclusion of the exposure.

In order to hold the control disk 58 fast in the position shown in FIG. 3, during the actual exposure, there is a latching pawl 96 rotatably mounted on a fixed pivot 98 and urged in a counterclockwise direction by a restoring spring 100. The latching nose of this pawl engages behind the lug 66 of the disk 58 when the disk has swung all the way around to its extreme position in a clockwise direction, as shown in FIG. 3. However, this latching pawl has a tail 102 which lies in the path of movement of the pin 78 on the blade ring 12 just as the blade ring completes its counterclockwise movement after making an exposure, so that just as the exposure is completed the latching pawl 96 is deflected by engagement with the pin 78, thereby releasing the lug 66 on the control disk 58 and allowing the control disk to return in a counterclockwise direction to its initial position.

The driving and return mechanism for the control shaft 60, together with the mechanism for tensioning or cocking the shutter, will now be described with reference particularly to FIGS. 6 and 7 of the drawings. The description is given with reference to the preferred internal arrangement of a single lens reflex camera, this being advantageous for illustrative reasons, but it does not exclude the possibility that the driving and return mechanism and the mechanism for tensioning the shutter may be accommodated in the shutter housing itself. In connection with the description of the parts shown in FIGS. 6 and 7, it should be borne in mind that FIGS. 1–4 view the parts from the front, while FIG. 6 views the parts from the rear, so that any rotary movement which is described as a clockwise movement in connection with FIGS. 1–4 will be a counterclockwise movement of the corresponding part with reference to FIG. 6, and vice versa.

Figure 6:
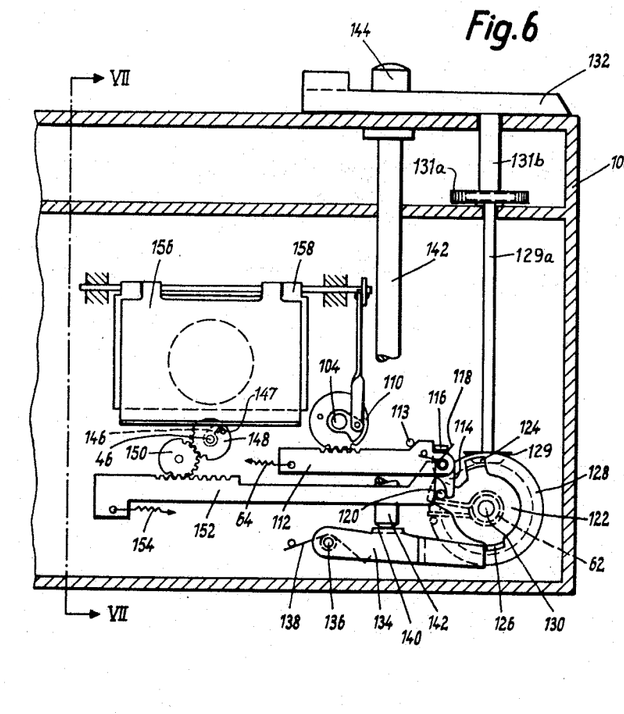
FIG. 6 is a fragmentary schematic view of the camera body seen from the rear, with the rear wall and other parts removed in order to show interior parts.
Figure 7:
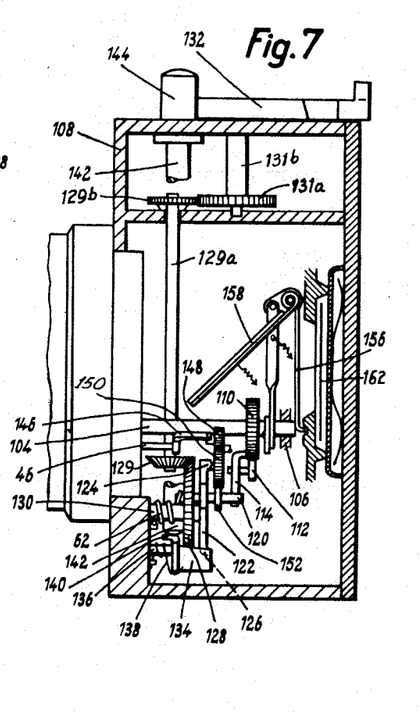
FIG. 7 is a fragmentary schematic vertical section through the camera body, taken approximately on the line VII—VII of FIG. 6.

A shaft 104 in FIGS. 6 and 7 corresponds functionally to the shaft 60 of the control disk 58, and may be either a rearward extension of the same shaft 60 or another shaft suitably coupled to the shaft 60 to turn therewith. This shaft 104 is rotatably supported in part in a partition 106 of the camera body which is indicated in general at 108. The shaft carries a gear wheel 110 which meshes with a rack 112 mounted in the camera body in any convenient conventional way so as to be longitudinally slideable therein. The restoring spring 64, connected to the left end of the rack 112 and pulling leftwardly thereon, urges the rack in a leftward direction toward its limit position or rest position determined by a stationary pin 113. Because of the meshing engagement with the gear 110, leftward movement of the rack 112 under the influence of the spring 64 will turn the shaft 104 in a clockwise direction when viewed from the rear as in FIG. 6, thereby turning the shaft 60 of the control disk 58 in a counterclockwise direction when viewed as in FIGS. 1–4.

At the right hand end of the rack 112 is a pawl 114 pivoted to the rack and urged by its restoring spring 118 in a counterclockwise direction around its pivot, to a limit position determined by engagement of the tail 116 on the pawl with a shoulder on the rack. For cooperation with the pawl 114, there is a driver pin 120 projecting from the face of a driver disk 122, which disk carries two stops or abutments 124 and 126 constructed as bent lugs projecting from the face of the disk at different radial distances from the center thereof. The disk, together with a bevel gear 128 connected thereto to turn therewith, is mounted for rotation on a pivot 130 fixed in the camera. The driving spring 62, already briefly mentioned above, is wound around the pin 130, and has one end fixed in any suitable way, such as by bearing against a suitable fixed part, while the other end of this spring bears on the pin 120 and constantly tends to turn the driver disk 122 and the bevel gear 128 in a clockwise direction when viewed as in FIG. 6.

The bevel gear 128 is connected in driving relationship, through another bevel gear 129 meshing therewith and through any suitable conventional connections such as those illustrated schematically by the shaft 129a and gears 129b and 131a and shaft 131b, to the shutter tensioning lever 132 mounted in an accessible position on the camera body, such as on the top wall thereof. In conventional known manner, the details of which are not important for purposes of the present invention, the lever 132 may serve as a film transport lever as well as a shutter tensioning or cocking lever, and the connection diagrammatically illustrated between the lever 132 and bevel gear 128 preferably includes the conventional free wheeling device so that after the bevel gear 128 and the driver disk 122 have been moved to tensioned or cocked position, they may later move back or run down to rest position without affecting the lever 132.

In the tensioned or cocked position of the driver disk 122, the stop or abutment 126 thereof lies against the end of the latching pawl 134 which is mounted for oscillation on a fixed pivot 136 and which is subject to the action of a restoring spring 138 tending to lift the right hand end of the pawl to hold it in cooperative engagement with the abutment 126. A laterally bent lug 140 on latching pawl 134 underlies the lower end of a release rod 142 which extends up through the top wall of the camera to an accessible release knob or button 144 on the top.

The above mentioned tensioning shaft 46 which serves for tensioning or cocking the master member mechanism, has at its rear end a finger 146 fixed non-rotatably to the shaft and arranged to be engaged and driven by a driver pin 147 on a gear wheel 148 which is freely rotatable on a suitable fixed pin or shaft. The gear wheel 148 meshes with a second gear wheel 150 likewise freely rotatable on any suitable shaft or pin, which gear wheel 150 meshes also with a rack 152 mounted in any suitable known manner for longitudinal movement and subject to the action of a restoring spring 154 which constantly tends to move the rack 152 in a rightward direction when viewed as in FIG.

6, thus constantly tending to hold the vertical right hand edge of the rack against the driver pin 120 on the disk 122.

A conventional drive of a conventional light trap flap 156 and reflex viewing mirror 158 is operatively connected in known manner to the gear wheel 110 on the shaft 104, these connections being illustrated only schematically since they are of conventional form and the details are not important for purposes of the present invention. Suitable diaphragm opening mechanism of known form is preferably also coupled to the control shaft 60, being operated for example by the gear wheel 160 (FIG. 5) so as to open the adjustable diaphragm to maximum extent for viewfinding and focusing, and then to close it down again to the selected diaphragm aperture at the time the exposure is made, but the details of such construction are known per se and are not important for purposes of the present invention.

The construction of the individual parts of the mechanism having now been described, their functional relationship and operation will be explained. Let it be assumed that the shutter parts are in the tensioned or cocked position illustrated in FIGS. 1, 6, and 7. In this position the film 162 is protected against undesired exposure by means of the light trap flap 156, the viewing mirror 158 is in viewing position, and the shutter blades are wide open, so that an image of the scene is reflected by the mirror 158 into the conventional viewfinder, not shown, so that the operator may compose the scene and focus the camera.

When the photographer is satisfied with the composition and focus, he presses downwardly on the release plunger 144. This moves the right hand end of the latching pawl 134 downwardly so that it no longer is in the way of the abutment 126 on the driver disk 122. Hence the driver disk starts to turn in a clockwise direction under the influence of its previously tensioned spring 62.

As the disk 122 turns, the pin 120 thereon moves arcuately to the right from the position shown in FIG. 6. The pin, acting on the pawl 114, pulls the rack 112 rightwardly with it (against the force of its spring 64) and also allows the other rack 152 to move to the right under the influence of its spring 154. The rightward movement of the rack 152 does not move any parts of the shutter at this time, as it simply withdraws the pin 147 away from the finger 146 on the shaft 46, allowing space for the shaft 46 to turn at the proper time during a later stage of the exposure cycle. The rightward movement of the first rack 112, does, however, perform important functions.

First, the rightward movement of the rack 112 causes counterclockwise rotation of the gear 110 and shaft 104, with consequent clockwise rotation (when viewed as in FIGS. 1–4) of the shaft 60 and control disk 58. The lug or ear 66 on the control disk, engaging the arm 80a of the closing lever 80, causes the arm 80b of the closing lever to engage the pin 78 on the blade ring 12, to move the blade ring in a clockwise direction from the position shown in FIG. 1 to the position shown in FIG. 2, thereby swinging the shutter blades 14 to their extreme clockwise position, completely closing the exposure aperture 19. As the blade ring 12 moves clockwise position, the pin 31 thereon slides along the edge of the coupling member 28 until it comes opposite to the notch 30, and the spring 34 then swings the coupling member to cause the notch 30 to engage or embrace the pin 31, thereby coupling the blade ring to the master member mechanism as the blades reach their fully closed position from the previous open viewing position.

As the shaft 60 and control disk 58 continue to rotate in a clockwise direction beyond the position shown in FIG. 2, the lug 66 on the control disk continues to act on the arm 80a of the lever 80, thereby maintaining the shutter blades in closed position. During this time, the connection between the gear 110 and the light trap flap 156 and mirror 158 is effective to move the mirror and the light trap out of the way, to picture-taking position.

Upon further clockwise rotation, the pin 68 passes beyond the arcuate part 90 of the uncoupling lever 86, permitting the spring 92 to swing this lever to its ineffective position illustrated in FIG. 3. Then as the clockwise rotation of the control disk 58 continues further, the lug 66 passes beyond the end of the arm 80a and the restoring spring 84 restores the closing lever 80 to its normal rest position shown in FIG. 1, but the shutter blades still remain closed because the claw or notch 30 on the coupling member 28 has meanwhile grasped the pin 31 on the blade ring, thereby holding the blade ring stationary for the time being, and preventing the blade ring from moving in a counterclockwise direction under the influence of its light restoring spring 13.

As the clockwise rotation of the control disk 58 continues, the lug or ear 66 engages the beveled end 52a of the latch lever 52, and swings this lever in a counterclockwise direction on its pivot 54, releasing the nose of the latch from the lug or arm 48 of the master member mechanism. Approximately at the end of the clockwise movement of the control disk 58, the nose of the latch 96 snaps over the lug 66 on the control disk 58, as illustrated in FIG. 3, thus holding the control disk against return movement in a counterclockwise direction. The releasing of the exposure latch 52 and the engagement of the latch 96 occur approximately simultaneously with each other, and also approximately simultaneously with the release of the rack 112 from the pin 120, which release occurs after approximately one-half of a revolution of the driver disk 122 (under the influence of its spring 62) from the position shown in FIG. 6, and just before the driver disk reaches the limit of its running down motion, which is limited by engagement of the second lug 124 on the driver disk with the end of the latch member 134. During the clockwise motion of the control disk 58, the spring 76 has been able to turn the opening lever 74 in a clockwise direction to an out-of-the-way position (see FIGS. 2 and 3) where it will not interfere with the intended motion of the pin 78 during the subsequent exposure.

The pin 120 having released the pawl 114 of the rack 112, as above described, the rack 112 would now be free to move back in a leftward direction under the influence of its spring 64, so far as its connection to the driver disk 122 is concerned. However, it cannot immediately move back in this direction because it is operatively connected as above explained to the control disk 58 and control shaft 60, which are at this time latched by the latch 96 as above explained.

When the latch 52 is released by the motion of the lug 66 near the end of the clockwise rotation of the control disk 58, as above explained, the actual exposure part of the exposure cycle begins. The release of the latch 52 from the part 48 of the master member mechanism allows the master member mechanism to run down from its tensioned position seen in FIG. 1 to its rest position shown in FIG. 4, under the influence of the main spring or master spring 36. The running down movement continues until stopped by engagement of an edge of the member 22 with the stationary pin 38. During this running down movement, the master member 22 turns in a clockwise direction on its pivot 24 and the associated member 48 turns in a counterclockwise direction on its pivot 46, since these members 22 and 48 are geared to each other to turn together (but in opposite directions) by the gears 42 and 44.

The clockwise rotation of the master member 22 pulls the coupling member 28 in a rightward direction from the position shown in FIG. 3 (which illustrates the parts just as the latch 52 has been released and the master member mechanism is beginning its movement) to the position shown in FIG. 4. Since at this time the pin 31 on the blade ring is embraced by the notch or claw 30 on the coupling member 28, the blade ring will be pulled along with the coupling member, rotating in a counterclockwise direction, and will move the shutter blades 14 from the closed position shown in FIGS. 2 and 3, through a fully open position at the mid-point of the travel of the blades, and then will close them again by continued motion in the same direction, the other lobe or wing of each blade then lying across the exposure aperture 10 in overlapping relation to the corresponding lobes of the other shutter blades. This second closed position of the double-ended blades is not specifically shown in the drawings, but will be readily understood by those skilled in the art, especially those familiar with double-ended shutter blades. During the movement of the blade ring in a counterclockwise direction to open and then close the shutter blades, the blade ring may be acted upon in the usual conventional manner by a conventional clockwork or other form of delaying or timing mechanism, in order to produce an exposure of the desired duration or speed, but this is not illustrated because it is conventional and forms no part of the present invention.

Just as the blade ring 12 completes its counterclockwise rotation and completes the closing of the shutter blades after the exposure, the pin 78 on the blade ring engages the tail 102 of the latch 96 and swings this latch in a clockwise direction on its pivot 98 (against the force of its spring 100) so that the latch releases the lug 66 on the control disk 58. Thus the control disk is released for its return movement in a counterclockwise direction, under the influence of the restoring spring 64 (FIG. 6), it being remembered that at this time the pin 120 has already moved beyond the pawl 114 on the rack 112 so that the rack is free to return, by the force of the spring 64, as soon as the latch 96 is released.

Early in the return movement of the rack 112 and control disk 58, the connections to the light trap flap 156 and reflex mirror 158 are operated to bring the flap down to its protecting position and to bring the mirror into viewing position. This protection of the film has already been fully accomplished before the control disk 58, during its return movement, moves the opening lever 74 to engage the driver pin 78 on the blade ring 12, so as to move the blade ring approximately half way back from its extreme counterclockwise position toward its extreme clockwise position, thereby putting the shutter blades 14 in their intermediate position, fully open for viewing the scene and focusing. Also, during this counterclockwise restoring movement of the control disk 58, and before the opening lever 74 begins to act on the pin 78, the pin 68 on the control disk engages the arcuate part 90 of the uncoupling lever 86 and moves the uncoupling lever to the position shown in FIG. 4, so that the flange 94 on the uncoupling lever engages the ear 32 on the coupling member 28 and swings this coupling member on its pivot 26, against the force of the spring 34, to disengage the coupling member from the pin 31 on the blade ring. This frees the blade ring completely from the master member mechanism so that the action of the opening lever 74 on the pin 78 can turn the blade ring to open the shutter blades, notwithstanding that the master member mechanism remains stationary.

In this way, the parts are restored to the positions shown in FIG. 4, in which position the exposure has been completed, the film has been protected by the flap 156 against further exposure, the master member mechanism (parts 22, 28, 42, 44, and 48, etc.) remain in their run down or rest positions, but the control disk 58 and associated parts have been restored to their initial position by the force of the restoring spring 64.

Of course, all of these movements take place much more quickly than the time required to describe them. Although several movements of different parts take place between the time that the release plunger 144 is depressed and the time that the actual exposure begins, all of these movements occur in a small fraction of a second. Likewise after the completion of the actual exposure, the restoring movement of the control disk and the opening of the shutter blades again for viewing, all occur in a small fraction of a second.

At any convenient time after completing the exposure, the operator may tension or cock the shutter ready for the next exposure. This is done by operating the lever 132 as above explained, which serves to turn the bevel gear 128 and driver disk 122 back in a counterclockwise direction from their run-down positions to the tensioned or cocked positions shown in FIG. 6. During this tensioning movement, which involves a rotation of about one-half a revolution, the pin 120 deflects and snaps past the pivoted pawl 114 on the rack 112, without affecting the position of the rack 112, which is meanwhile held in its leftward position by the force of the spring 64. Therefore, the tensioning of the shutter does not in any way affect the position of the protecting flap 156 or the mirror 158, which remain in viewing position both before and after the tensioning operation. When the tensioning movement is completed and the tensioning lever 132 is released by the operator, it returns to its initial position by action of its conventional restoring spring, not shown.

The counterclockwise restoring movement of the driver disk 122 and its pin 120 does affect, however, the other rack 152, as the pin 120 pushes against the right end of this rack and moves the rack leftwardly (when viewed as in FIG. 6) against the force of the spring 154. This turns the gear 150 in a clockwise direction and the gear 148 in a counterclockwise direction, so that the pin 147 thereon engages the arm 146 on the shaft 46 and turns this shaft in a clockwise direction when viewed as in FIGS. 1-4 (but in a counterclockwise direction when viewed as in FIG. 6) until the arm 48 latches behind the nose of the main exposure latch 52, thereby holding the master member mechanism in cocked or tensioned position until the latch 52 is once more released during the next exposure cycle. During this clockwise rotation of the member 48, it momentarily deflects the latch 52 against the force of its spring 56, so that the latch snaps behind the arm 48 when the latter reaches its fully tensioned position.

The clockwise tensioning movement of the member 48 and shaft 46 is transformed by the gears 42 and 44 into a corresponding counterclockwise rotation of the master member 22, thereby winding up and again tensioning the main spring 36. The counterclockwise movement of the crank pin 26 on the master member serves to move the coupling member 28 in a leftward direction from the run-down position of FIG. 4 to the tensioned position of FIG. 1. During this movement the ear 32 on the coupling member 28 rides on the outer face of the flange 94 on the uncoupling lever 86 until it passes beyond the pin 31 and drops off the left end of the flange 94, thereby preventing the notch or claw 30 from engaging the pin 31 when it moves past this pin. It will be remembered that at this time the blade ring 12 and pin 31 are in an intermediate position approximately midway of their two extreme positions, with the shutter blades fully open. After the ear 32 drops off the left end of the flange 94, the spring 34 swings the coupling member 28 clockwise on its pivot 26 until the inner edge of the coupling member engages the pin 31, the inner edge thereafter sliding past the pin in contact therewith until the tensioned position of FIG. 1 is reached. If desired, there might be a slight depression in the edge of the coupling member 28 to engage with the pin 31 when the parts are in the position shown in FIG. 1, this depression being best seen in FIG. 2.

It may be mentioned that during the counterclockwise restoring movement of the control disk 58, the lug 66 thereon may touch the arms 80b and 80a of the closing lever 80, but this does not interfere with the restoring movement since the spring 84 allows the closing lever 80 to be deflected slightly in either direction, to the extent necessary to enable the lug 66 to pass the lever 80 during the restoring movement to initial position.

It may be emphasized at this point that the parts which move during the actual exposure portion of the cycle are few in number and have low mass and inertia, so that an exposure of very high speed is possible. The control disk 58 and associated parts are operatively disconnected from the blade ring 12 at the time of the actual exposure, so do not add any mass or inertia or any friction to the parts which must be moved during the actual making of the exposure. In the control mechanism as a whole, even including the parts illustrated in FIGS. 6 and 7, there is a relatively small number of components in comparison to the various functions to be performed, and highly satisfactory operation is assured. The parts which serve to open and close the shutter blades during the viewing movements (before and after the actual exposure opening) likewise have low mass and inertia and low friction, so that these movements can be easily performed with relatively light spring power.

To recapitulate the operation very briefly, downward movement of the release plunger 144 releases the latch 134 and allows the driver disk 122 to start its clockwise rotation through its range of approximately one-half of a revolution, until it is stopped by engagement of the lug 124 with the latch 134. During this half revolution of the disk 122, the pin 120 thereon draws the rack 112 rightwardly, with the result that the control disk turns clockwise the previously open (for viewing) shutter blades are closed by the closing lever 80, and then the light trap 156 and mirror 158 are moved to their ineffective positions.

Continued rotation of the control disk 58 releases the second latch 52 so that the master member mechanism starts to run down under the power of its spring 36, the driver disk 122 meanwhile remaining stationary in its rest position. During the running down of the master member mechanism, the master member 22 turns clockwise from the position shown in FIG. 3 to the position shown in FIG. 4, and the coupling member 28, being coupled at this time to the pin 31 on the blade ring 12, draws the blade ring with it in a counterclockwise direction, moving the shutter blades from the fully closed position shown in FIG. 3 to swing the double-ended blades through their completely open position (FIG. 4) to another fully closed position (not illustrated) where the opposite lobes of the blades serve to close the aperture 10. At the conclusion of this exposure operation, the pin 78 on the blade ring unlatches the third latch 96 so that the control disk 58 can return in a counterclockwise direction under the influence of the spring 64, and during this return movement the light trap 156 is restored to its protecting position with respect to the film 162, after which the opening lever 74 is operated by the movement of the control disk 58 to engage the pin 78 to move the shutter blades once more to the open viewing position shown in FIG. 4. Thus the shutter blades are normally open, for viewing and focusing purposes, both before and after the actual exposure, and they remain open while the master member mechanism is being restored from its run-down or rest position of FIG. 4 to its tensioned position of FIG. 1.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. An objective photographic shutter for a single lens reflex camera, comprising double ended shutter blades each mounted for pivotal movement in a single direction from a first closed position at one end of its range of travel through an intermediate open position to a second closed position at the opposite end of its range of travel, a rotatable blade ring operatively connected to said blades to move them in one direction through said range by movement of said blade ring in one direction through its range of travel, a spring operated driving element, and a main spring for driving the same, characterized by the provision of a positive driving connection between said driving element and said blade ring during movement of said blade ring in one direction to make an exposure by moving said blades from their first closed position through open position to their second closed position, a rotary control member, an uncoupling lever oscillatable on a fixed axis, a portion of said rotary control member being arranged, during rotation of said control member in one direction, to operate said uncoupling lever to disconnect said positive driving connection after the shutter blades reach their second closed position, a blade opening lever also oscillatable on a fixed axis, a portion of said rotary control member being arranged, during rotation in said one direction, to operate said opening lever to cause said opening lever to engage and move said blade ring to an intermediate blade-open position subsequent to the disconnection of said driving connection, a blade closing lever oscillatable on a fixed axis, and a portion of said rotary control member being arranged, during rotation of said control member in an opposite direction, to operate said closing lever to cause said closing lever to engage and move said blade ring in the same direction in which it was moved by said opening lever, to one end of its range of travel to close the shutter blades.

2. A construction as defined in claim 1, further including a return spring operatively connected to said rotary control member to tend to turn it in said one direction, and a drive spring operatively connected to said rotary control member to turn it in said opposite direction with sufficient force to overcome the force of said return spring and to tension the return spring, the operative connection between said drive spring and said control member being automatically disconnected at the end of rotation of said control member in said opposite direction so that said return spring may then turn said control member in said one direction.

3. A construction as defined in claim 2, further including a latch for holding said rotary control member substantially at the end of its movement in said opposite direction, to retain it against return movement in said one direction under the force of said return spring, and a part on said blade ring for engaging said latch to unlatch it substantially at the end of movement of said blade ring in exposure-making direction, so that said return spring may then turn said rotary control member in its said one direction to disconnect the driving connection between the driving element and the blade ring and to move the blade ring to an intermediate position to open the blades.

4. An objective photographic shutter for a single lens reflex camera, comprising double ended shutter blades each mounted for pivotal movement in a single direction from a first closed position at one end of its range of travel through an intermediate open position to a second closed position at the opposite end of its range of travel, a rotatable blade ring operatively connected to said blades to move them in one direction through said range by movement of said blade ring in one direction through its range of travel, a spring operated driving element, and a main spring for driving the same, characterized by the provision of a positive driving connection between said driving element and said blade ring during movement of said blade ring in one direction to make an exposure by moving said blades from their first closed position through open position to their second closed position, a rotary control member effective during rotation in one direction to disconnect said positive driving connection between said driving element and said blade ring and to move said blade ring to an intermediate blade-open position and effective during rotation in an opposite direction to move said blade ring a further distance in the same direction to close the blades, a drive spring for driving said rotary control member in said opposite direction, means for freeing said control member from said drive spring at the end of the movement of said control member in said opposite direction, a return spring for turning said control member in said one direction when it is freed from said drive spring, and means for concomitantly tensioning said main spring of said driving element, tensioning said drive spring, and reconnecting said drive spring operatively to said rotary control member.

5. A construction as defined in claim 4, further including a first releasable latch for holding said drive spring in tensioned position, a second releasable latch for holding said main spring in tensioned position, a third releasable latch for holding said rotary control member substantially at the end of its movement in said opposite direction to prevent return thereof in said one direction under the force of said return spring, said rotary control member being normally in a rest position at the end of its movement in said one direction when the shutter has been tensioned and is ready for operation through a new exposure cycle, means for releasing said first latch to initiate an exposure cycle so that said drive spring may drive said control member in said opposite direction, means operated by movement of said control member in said opposite direction for releasing said second latch so that said main spring may operate said driving element to move said blade ring to open and then to close the shutter blades, and means operated by movement of said blade ring for releasing said third latch so that said return spring may move said control member in its said one direction back to its rest position.

6. A photographic shutter comprising blades movable through a range from a first extreme position through an intermediate position to a second extreme position, said blades being open to admit light in said intermediate position and being closed to exclude light in both of said extreme positions, a master spring, a master driving member operatively connected to said master spring to be driven thereby through a running-down movement from a tensioned position to a rest position, a control member movable through a range of movement between a tensioned position and a rest position, a restoring spring operatively connected to said control member to move it from tensioned position to rest position, a drive element movable through a range of movement between a tensioned position and a rest position, a drive spring operatively connected to said drive element to move it from tensioned position to rest position, means for moving said drive element from rest position to tensioned position, means operated by movement of said drive element from rest position to tensioned position for moving said master driving member from its rest position to tensioned position, a first releasable latch for holding said drive element in tensioned position, a second releasable latch for holding said master driving member in its tensioned position, a third releasable latch for holding said control member in its tensioned position, a movable coupling element shiftable between an uncoupled position and a coupling position effective to couple said master driving member in operative driving relation to said blades, means for releasing said first latch to initiate an exposure cycle when said blades are in said intermediate position, so that said drive element may move from its tensioned position toward its rest position, means operated by such movement of said drive element for moving said control member from its rest position to its tensioned position, means operated by such movement of said control member for moving said blades from intermediate position to their first extreme position, means for moving said coupling element to coupling position while said master driving member is in tensioned position and said blades are in their first extreme position, means also operated by movement of said control member toward tensioned position for releasing said second latch so that said master driving member may move from its tensioned position to its rest position, means operated by such movement of said master driving member and acting through said coupling element for moving said blades from their first extreme position through intermediate position to their second extreme position, means operated by said blade moving means for releasing said third latch substantially when said blades reach their second extreme position so that said control member may move from its tensioned position toward its rest position, and means operated by such movement of said control member for shifting said coupling element to uncoupled position and for moving said blades from their second extreme position to their intermediate position.

References Cited in the file of this patent

UNITED STATES PATENTS

| | | |
|---|---|---|
| 2,410,629 | Carroll | Nov. 5, 1946 |
| 2,448,876 | Fuerst | Sept. 7, 1948 |
| 2,730,025 | Faulhaber | Jan. 10, 1956 |